METHOD AND APPARATUS FOR SIGNAL MODULATION CONTROL

Filed Oct. 20, 1964

INVENTOR.
EDWARD C. LOCKWOOD
BY
Diggins and O'Boyle
ATTORNEYS 3,320,536
Patented May 16, 1967

3,320,536

METHOD AND APPARATUS FOR SIGNAL MODULATION CONTROL

Edward C. Lockwood, Miami, Fla., assignor to Storer Broadcasting Company, Miami Beach, Fla., a corporation of Ohio Filed Oct. 20, 1964, Ser. No. 405,214
9 Claims. (Cl. 325—187)

Figure 1:
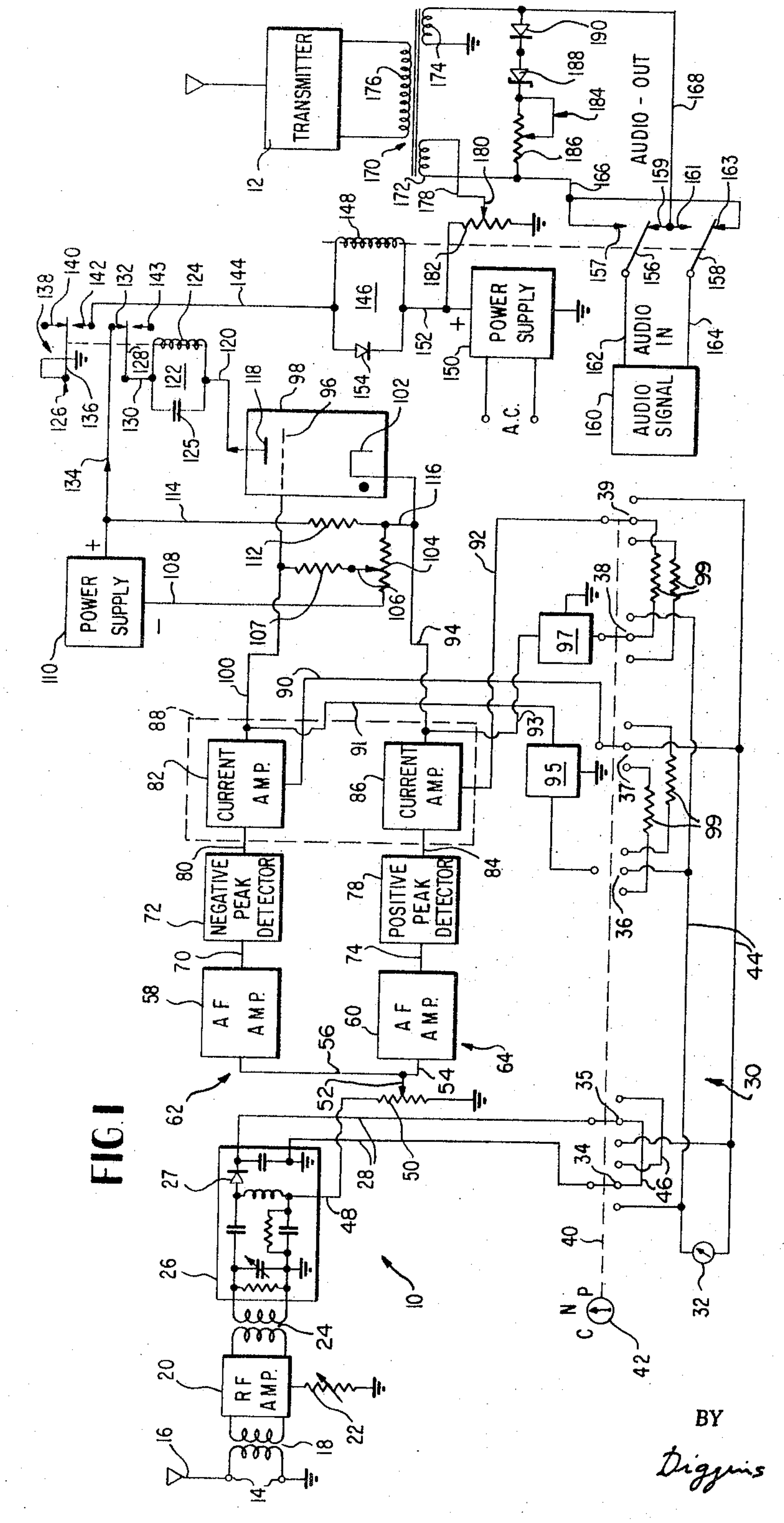

This invention relates to a novel method and apparatus for maintaining a high average percentage of modulation in amplitude modulated transmitters, and more particularly to a method and apparatus for reversing the polarity of the audio lines connected to the modulator circuit of a transmitter whenever the negative portion of the audio signal becomes greater than a predetermined value so as to maintain maximum modulation.

Since the carrier or transmitting power of each commercially operated radio station is set by a Federal license and cannot be exceeded, the inherent limit to the coverage of a radio station is fixed. However, as is well known, the greater the percentage of modulation that a station operating with a fixed transmitting power can maintain the louder the station will sound and, consequently, the larger will be the area within which the signal will override various man-made and natural noises such as static. In fact, it has been found that a one-kilowatt transmitter with 100% modulation is capable of servicing approximately the same area as a two-kilowatt transmitter operating with only 70% modulation. Therefore, the major problem confronting operators of amplitude modulated broadcast transmitters is how they can maintain the average percentage of modulation of their transmitters as high as possible thereby making the most efficient use of their transmitting facilities and allotted power output without overmodulating the carrier and thus producing undesirable side bands.

Heretofore, radio transmitter operators have attempted to maintain a high average modulation level while employing various clipper or limiting circuits for governing or limiting the modulation process in a manner so as to prevent the maximum amplitude of a modulating audio wave from exceeding a predetermined value. These prior art circuits have, in general, approached the problem of overmodulation by interposing a limiter stage in the signal path of the modulator to confine the amplitude of the signal within limits such that under normal operating conditions the amplitude of the audio signal never exceeds that of the carrier. With such a limiter in operation, the radio transmitter operator would then increase the modulation gain of the transmitter until the average positive modulation value approaches 100%. Such limiter stages are effective in preventing excessive modulation of the carrier wave in only a positive direction, however, and will not prevent excessive modulation in a negative direction. In other words, they will not prevent the envelope of a modulated carrier wave from arriving at a zero value thus cutting off the carrier during the negative troughs of the audio signal wave which, in turn, gives rise to an undesirable splattering effect. This splattering produced by negative overmodulation causes interference with adjacent radio frequencies, and is evidenced by sounds resembling key clicks or the like. Overmodulation is, therefore, highly undesirable. Furthermore, the clipping of the audio or carrier wave contributes additional distortion to the transmitted signal which is reproduced in the receiver system and in most instances is very undesirable.

Since it has been found that some music and most speech, when translated into electric wave energy, produce a resultant signal which has greater peak amplitudes of one polarity than of the other, and since the phenomena called "overmodulation" or "splattering" with the accompanying radiation of spurious signals is due principally to the flattening of a modulated carrier envelope on the zero axis rather than by extension of the maximum modulated signal amplitude beyond a positive level of twice the amplitude of the carrier when unmodulated, it is highly desirable that such higher peaks of the signal wave produce the positive modulation peaks of the modulated signal and that the smaller peaks of opposite polarity produce the negative modulation peaks. The provision of such operation greatly reduces or eliminates any negative overmodulation and at the same time allows more energy to be radiated for a given signal wave, assuming maximum permissible modulation, with a corresponding increase in efficiency.

According to the present invention, it has been found that the higher peak of an audio signal wave can be used to produce the positive modulation peaks of a modulated carrier wave by automatically reversing the audio lines to the modulator unit of the transmitter whenever the amplitude of the negative peaks of the audio signal exceeds that of the positive peaks. This operation also prevents the modulated carrier envelope from approaching zero or a negative overmodulation condition. To obtain this automatic reversal of the audio lines, a polarity sensing and switching apparatus is used. The polarity sensing portion of the system constantly monitors the ratio of upward or positive modulation of the carrier wave to downward or negative modulation thereof and whenever the ratio of negative modulation to positive modulation is greater than unity, the polarity of the audio or program line feeding the modulator unit of the transmitter is reversed by the switching unit so that the greater peak modulation is maintained in the upward or positive direction at all times.

Accordingly, the primary object of this invention is to provide a modulation control method and system for maintaining a high average percentage of modulation in a radio transmitter or other communication system while substantially eliminating the danger of negative overmodulation.

Another object of this invention is to provide a modulation control system for automatically preventing splattering of a radio signal due to negative overmodulation.

Yet another object of this invention is to provide a modulation control system for an audio modulated transmitter which constantly monitors the ratio of negative modulation to posititve modulation of a modulated carrier signal and automatically reverses the phase of the audio signal to the transmitter whenever the ratio is greater than unity to maintain a maximum modulation level while substantially eliminating the danger of negative overmodulation.

Still another object of this invention is to provide a modulation control system for a radio transmitter which is compatible with existing transmitter equipment and can be used therewith without requiring any modifications of the equipment.

A further object of this invention is to provide a novel modulation control system for a radio transmitter which includes a polarity sensing and switching system that operates to permit the transmitter to be operated at a higher average modulation level than has heretofore been possible.

A still further object of this invention is to provide a modulation control system having the above enumerated desirable characteristics yet which is relatively inexpensive to produce, simple to install and is easy to operate.

Figure 2:
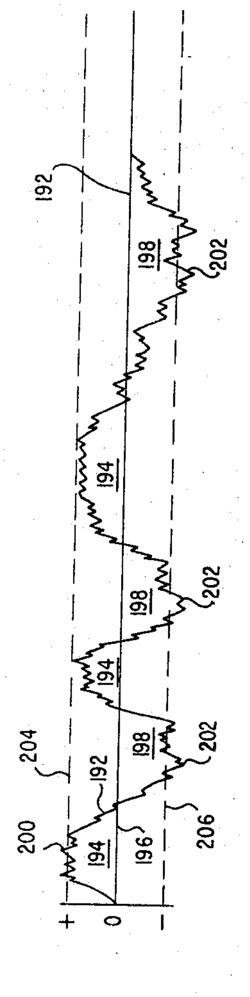

These and further objects and advantages of the present invention will become more apparent upon reference to the following specification, claims, and appended drawings wherein:

FIGURE 1 is a block diagram of the modulation control system of the present invention; and FIGURE 2 is an explanatory curve relating to the operation of the modulation control system of FIGURE 1.

With continuing reference to the accompanying drawings wherein like reference numerals designate similar parts throughout the several figures, and with initial attention directed to FIGURE 1, reference numeral 10 generally designates a modulation control system constructed in accordance with the present invention. An audio modulated radio frequency carrier signal from a transmitter 12, whose audio modulation is being controlled by the modulation control system of the present invention, is applied across the input terminals 14 of the system by any suitable method, such as, an antenna 16. The modulated carrier signal applied to the input terminals 14 is in turn coupled through a tuned transformer circuit 18 to a variable radio frequency amplifier circuit 20.

The radio frequency amplifier circuit 20 serves not only to amplify the incoming radio frequency signal but also to adjust its output level or amplitude so that the output signal taken from the amplifier will be of a predetermined value. This adjustment of the radio frequency gain of the amplifier 20 is accomplished by means of a variable resistor 22 which varies the cathode resistance of an amplifier tube or which otherwise varies the impedance of the amplifier 20 in a manner known to the amplifier art.

The amplified radio frequency output signal from the amplifier 20 is coupled by a suitable electrical conductor, such as a transformer 24 to the input terminals of an audio detector circuit 26 which is preferably of a type having a low distortion factor. Detector circuit 26 may comprise any one of several well known diode detector circuits which include a diode element to pass the carrier signal while blocking the audio modulation signal. One such circuit including a diode element or detecting unit 27 is shown for illustrative purposes in FIGURE 1.

In order to determine if the radio frequency signals produced by the amplifier circuit 20 are at a predetermined value and thus if the variable resistor 22 is properly adjusted, a current proportional to the amplitude of the amplified RF carrier signal is connected from the detector 26 through electrical conductors 28 to a metering circuit generally indicated at 30. This current may be obtained at the carrier signal output side of the diode detecting unit 27 included in the detector circuit 26.

Metering circuit 30 consists of a milli-ampere meter 32, and a plurality of two-pole, three-position switches 34–39. The switches 34–39 are gang operated by a common connection 40 which is in turn connected to a switch knob or like device 42. The meter 32 is connected through a common pair of bus bars 44 and suitable electrical conductors to the contact terminals of the switches 34–39.

With the switch knob 42 set in the C or carrier signal position, the contact arms of the switches 34 and 35 will be moved to the left in FIGURE 1, thereby electrically connecting the conductors 28 so that the signal from the detector circuit 26 is applied directly across the meter 32. Thus the strength of the amplified RF carrier signal from the amplifier 20 is recorded and can be read directly from the meter 32. If it is found that the meter reading is too high or low, then the gain of the radio frequency amplifier 20 is reduced or increased as the case may be by adjusting the variable resistor 22 until the strength of the indicated carrier signal is at a predetermined desirable level. To assure the proper operation of the detector circuit 26 when the switches 34–39 are in another position other than the C or carrier signal position, shorting links 46 are electrically connected between the other contact terminals of the switches 34 and 35.

The audio frequency signal produced by the detector circuit 26 is fed through an electrical conductor 48 to a variable resistor 50 which serves as an audio input gain control for the remainder of the modulation control system 10. The movable contact 52 of the variable resistor 50 is connected by electrical conductors 54 and 56 to the input terminals of two separate linear audio frequency amplifier circuits 58 and 60 which form the first stage of two separate peak sensing sections generally designated at 62 and 64, respectively.

The audio frequency amplifier circuits 58 and 60 are of the fixed gain type and provide amplified audio output signals which are taken from each of the amplifiers 58 and 60 by means of electrical conductors 70 and 74 respectively. Amplifiers 58 and 60 are identical amplifiers so that substantially the same gain is maintained in the peak sensing sections 62 and 64. The electrical output conductor 70 of the audio frequency amplifier circuit 58 is connected to the input terminal of a peak detector circuit 72 and the electrical output conductor 74 from the audio frequency amplifier circuit 60 is connected to a similar peak detector circuit 78. The detector circuits 72 and 78 are responsive to opposite polarity peak pulses with circuit 72, for purposes of illustration, being responsive to the negative peaks of the input audio signal and circuit 78 responsive only to the positive peaks of the audio signal. The peak detector circuits 72 and 78 operate to produce fluctuating D.C. output voltages of the same polarity which are proportional to the positive and negative peaks of the audio modulated carrier wave or signal received at the input terminals 14.

The fluctuating D.C. voltage produced by the peak detector circuit 72 is coupled through an electrical conductor 80 to a current amplifier circuit 82 which serves as a vacuum tube voltmeter while the fluctuating D.C. voltage produced by the peak detector circuit 78 is coupled through an electrical conductor 84 to a similar current amplifier circuit 86 which forms a second vacuum tube voltmeter. The current amplifiers 82 and 86 may be formed by a single dual triode tube, as indicated by the dotted lines 88, and each of the amplifiers 82 and 86, taken with their corresponding peak detectors 72 and 78 may be formed from peak responsive, half-wave diode voltmeter circuits similar to those previously known to the art.

Current amplifiers 82 and 86 are each normally producing equal strength output signals of the same polarity. An output signal from both the current amplifiers 82 and 86 is applied to the metering circuit 30 so that the peak amplitude of the output signal from each current amplifier may be selectively measured. Electrical conductors 90 and 91 are employed for electrically connecting the output from the current amplifier 82 to the movable contact terminals of the switches 36 and 37, while similar conductors 92 and 93 are employed for connecting the output from the current amplifier 86 to the movable contact terminals of the switches 38 and 39. Zeroing units 95 and 97 are connected in the circuit extending between the amplifiers 82 and 86 and the metering circuit 30 by conductors 91 and 93 and operate to insure that both of the vacuum tube voltmeters are maintained in a symmetrical relationship. Zeroing units 95 and 97 may constitute variable resistive bridge circuits or similar variable resistive units which may be varied to maintain a reading of zero on the meter 32 when no signal is present across the terminals 14. If the current amplifiers 82 and 86 constitute triode amplifiers, the zeroing units 95 and 97 may be operated to vary the cathode resistance in each triode to secure a balanced upward swing of plate current in each triode, thus securing the same voltage at both triode cathodes.

As in the case of the switches 34 and 35, the various unused, fixed contact terminals of the switches 36–39 are shorted together through resistor elements 99 so that the peak detector sections 62 and 64 will function correctly whenever they are not connected to the meter 32.

With the switch knob 42 set in the N or negative polarity position as shown in FIGURE 1, an output signal is passed from the current amplifier 82 through the meter 32 by means of the conductor 91, the zeroing unit 95, the switches 36 and 37 and the conductor 90. A similar action occurs with respect to the output signal from the current amplifier 86 when the knob 42 is set in the P or positive polarity position as shown in FIGURE 1. With the knob 42 in the P position, an output signal is passed from the current amplifier 86 through the meter 32 by means of the conductor 93, the zeroing unit 97, the switches 38 and 39, and the conductor 92.

The fluctuating D.C. output signals produced by the current amplifier 86 are coupled by an electrical conductor 94 to the cathode 102 of a gas thyratron relay control tube 98 while the fluctuating D.C. output signals produced by the current amplifier 82 are coupled by an electrical conductor 100 to the control grid 96 of the control tube 98. In order to adjustably set the bias level and thus the firing point of the control tube 98, the grid 96 is also connected to a variable resistor 104 through a sliding contact 106 and a voltage dropping load resistor 107. One end of the resistor 104 is connected by an electrical conductor 108 to the negative terminal of a D.C. power supply 110 while the other end of the variable resistor is connected by a resistor element 112 and electrical conductor 114 to the positive terminal of the power supply 110. The junction point between the resistors 104 and 112 is connected by electrical conductor 116 to the cathode 102 of the control tube 98 for the establishing a reference point for the power supply 110 since it is "floating" or in an ungrounded state.

The anode 118 of the control tube 98 is connected by an electrical conductor 120 to one terminal of a relay circuit 122. The relay circuit 122 consists of an electromagnetic relay coil 124 which serves to operate a double pole, double throw switch 126 which is shown in FIGURE 1 in its normal position. To insure the proper operation of the relay coil 124, a capacitor 125 is connected across the terminals of the coil. The first movable contact 128 of the relay is electrically connected to the other terminal of the relay coil 124 by an electrical conductor 130 so that the coil is normally connected through the fixed contact 132 and electrical conductor 134 to the positive terminal of the D.C. power supply 110. The second movable contact 136 is connected to ground through an electrical conductor 138 and normally rests against a fixed contact 140. The fixed contact 142, which is normally not connected to the movable contact 136, is connected through an electrical conductor 144 to a polarity changing pulse relay circuit generally designated at 146.

The pulse relay circuit 146 includes an electromagnetic relay coil 148 which has one terminal connected to the conductor 144 and the other terminal connected to a D.C. power supply 150 through an electrical conductor 152. To increase the operating characteristics of the relay circuit 146, a diode 154 is connected across the relay coil 148 in a well known manner. The relay coil 148 is operatively connected to a pair of movable contact terminals 156 and 158 which are of the stepping type and are shown in their first position. An audio signal from an audio source 160, which is used to modulate the transmitter 12, is applied through electrical conductors 162 and 164 to the movable relay contacts 156 and 158, respectively.

As seen in FIGURE 1, fixed relay contacts 157, 159, 161, and 163 cooperate with the stepping relay contacts 156 and 158 and are connected to the transmitter input circuit so that the polarity or phase of the incoming signal from the audio signal source 160 is reversed each time the relay circuit 146 is energized. This causes the audio output signals which are delivered to the electrical conductors 166 and 168 through the relay contacts 156 and 158 to also be reversed.

When the control tube 98 is fired, current will flow through the relay coil winding 124 thus pulling the movable contacts 128 and 136 downward until they engage the fixed contacts 142 and 143. This results first in the gaseous control tube 98 being extinguished since the circuit between the contacts 128 and 132 is opened and secondly in the movable contact 136 engaging the contact 142 thereby completing an electrical circuit to the pulse relay circuit 146. The coil winding 148 is thus momentarily energized and the movable contacts 156 and 158 of the pulse relay 146 are switched or stepped thereby changing the polarity of the audio input signal applied to the modulator unit of the transmitter 12. Since the gaseous control tube 98 is extinguished when the movable contact is pulled away from the contact 132, the coil winding 124 will be deenergized and will permit the contacts 128 and 136 to return to their original position until the tube 98 is once again fired.

An audio transformer 170 having two primary windings 172 and 174 and a singular secondary winding 176 is utilized for coupling the audio signal to the transmitter 12. The electrical conductor 166 is connected to one terminal of the winding 172 while the other terminal of winding 172 is connected by conductor 178 to the movable contact 180 of the variable resistor 182. The variable resistor 182 is in turn connected across the direct current power supply 150. The electrical conductor 168 is connected to one terminal of the winding 174 while the other terminal of the winding 174 is electrically connected to ground potential.

A conventional negative peak limiter 184 for limiting the negative peak signals from the audio signal source 160 is placed across the primary windings 172 and 174, as seen in FIGURE 1. This circuit includes a variable resistor 186, a Zener diode 188 and a solid state diode 190 connected in series between the electrical conductors 166 and 168. The reference or threshold level of the negative peak limiter 184 is set by adjusting the variable resistor 180 while the compression limit of the circuit is set by the variable resistor 186. Thus, by adjusting the variable resistors 180 and 186, the exact limiting action desired on any particular occasion can be obtained.

The overall operation of the modulation control system 10 can best be explained in reference to FIGURE 2. FIGURE 2 pictorially represents a typical audio signal 192 produced by the audio signal source 160 of FIGURE 1 and contains a positive component 194, which appears above the average reference line 196, and a negative component 198. As is typical of audio signals, certain positive peaks 200 and negative peaks 202 are produced which exceed to varying extents the average maximum peak levels indicated by the broken lines 204 and 206. It is standard practice in the art to adjust a transmitter so that its maximum or 100 percent modulation level corresponds to the average maximum peak levels such as shown at 204 and 206. This procedure permits the maximum average modulation of the carrier wave without undue overmodulation occurring but, needless to say, peak pulses as represented at 200 and 202, undesirably overmodulate the transmitter. It is this overmodulation and especially that produced by the negative peak pulses 202 which causes the excessive splattering and adjacent side band interference. In many transmitters, the positive peaks 200 can be gainfully employed to increase the average modulation of the transmitter, for many transmitters are constructed to operate with positive modulation of greater than 100% without undesirable transmission effects.

The audio signal 192 is applied through conductors 162–164, pulsing switch contacts 156–158, and conductors 166–168 to the input transformer 170 of the transmitter 12 (see FIGURE 1). With the transmitter 12 properly adjusted for as high an average modulation as possible without excessive overmodulation and with the modulation control device 10 of the invention turned off, the audio signal 192 will modulate the carrier wave of the transmitter to produce a modulation envelope. However, the excessive or larger than average peak pulses 200 and 202 which exceed the 100 percent modulation levels 204–206 of the transmitter cause varying amounts of distortion in the modulation envelope so produced. The positive peak pulses 200 produce overmodulation which, as explained hereinabove, does not create a very serious problem since the transmitter 12 can be built to tolerate such positive overmodulation without producing any appreciable side band interference.

This is not true, however, for the negative peak pulses 202 since they drive the transmitter so as to completely cut off the modulated carrier envelope during the negative troughs 202 of the audio signal. The cutting off of the carrier in turn produces spurious side bands which cause interference in adjacent channels that normally would be available for use with other transmitter equipment. Thus, it is seen that the principal cause of splatter or adjacent channel interference is overmodulation of the negative peaks 202 which distorts the modulation envelope produced by the transmitter 12 and causes it to be rich in harmonics.

From the above it becomes readily apparent that if the pulses 202 that exceed the 100 percent negative modulation level of the transmitter 12 could be made to occur only in the positive direction, then any negative overmodulation occurring would not produce any appreciable distortion in the modulation envelope or give rise to adjacent channel interference. Also, in the absence of both positive and negative overmodulation, it is extremely desirable to maintain a maximum modulation level at all times. Therefore if the negative peaks of the audio signal 192, although not in the excess of the 100 percent negative modulation level, exceed the amplitude of the positive audio peaks, it is extremely beneficial if the average modulation level of the transmitter 12 can be raised to the negative peak level.

The modulation control device 10 of the present invention operates effectively to sense and effectively employ the negative portions of an audio modulation signal when such negative portions exceed the amplitude of the positive portions of the signal. Also the modulation control device 10 operates to preclude negative overmodulation of a transmitter carrier wave.

With reference to FIGURE 1, the modulation control device 10 is operated by first employing the metering circuit 30 to facilitate adjustment of the gain of the audio frequency amplifier 20 and the balancing of the vacuum tube voltmeter 88 in the manner previously described. For this purpose, a test signal may be applied across the input terminals 14 from any suitable test source. With the device 10 so adjusted, the modulation envelope from the transmitter 12 is applied through the input terminals 14 to the radio frequency amplifier circuit 20 which increases the amplitude of the received signal before it is supplied to the detector circuit 26. The detector circuit 26 rectifies the modulated envelope, thereby producing an audio signal which is applied through the variable resistor 50 to the peak detector sections 62 and 64.

The audio signals applied to the peak detector sections 62 and 64 are amplified by the amplifiers 58 and 60 and divided in polarity by the detectors 72 and 78. The negative peak detector 72 will respond only to the negative polarity portion of the audio signal from amplifier 58, and fluctuating D.C. output signals from the detector 76 are applied to the current amplifier 82. The positive peak detector 78 responds only to the positive portion of the detected audio signal from the amplifier 60 and applies a fluctuating D.C. output signal to the current amplifier 86. Amplifiers 82 and 86 then provide signals of the same polarity but of amplitudes which vary in accordance with the positive and negative peaks of the modulated input signal to tube 98 by means of conductors 94 and 100.

As brought out hereinabove, the conductor 94 is connected to the cathode 102 of the gaseous tube 98 while the conductor 100 is connected to the control grid 96 of the tube. The grid 96 of the gaseous tube 98 is maintained at a negative bias level with respect to the cathode 102 by the variable resistor 104.

The average voltage variation between the grid and cathode of the tube 98 will depend upon the amplitude variation between the positive and negative excursions of the modulated envelope applied to the input terminals 14. If no signals were present at input 14, or if perfect average symmetry existed between the negative and positive excursions of the input signal, then the potential difference existing between the cathode 102 and grid 96 of the tube 98 would be that set by the negative bias level provided by the resistor 104.

Since perfect average symmetry seldom exists between the positive and negative peaks 200 and 202 of the audio signal 192 (FIGURE 2), a variation of symmetry will occur between the output signals produced by the vacuum tube voltmeters in the peak sensing sections 62 and 64. Whether this variation operates to fire the tube 98 depends upon the polarity and amplitude of the positive and negative peaks of the audio signal 192 over an average time period as determined by the parameters of the peak detector circuits 72 and 78. If the negative peaks 202, such as shown in FIGURE 2, have a greater average value over a period of time than the positive peaks 200, then the greater negative signal from the current amplifier 82 will cause the firing level of the tube 98 to be reached and the tube will fire. Energization of the tube 98 causes the pulse relay circuit 146 to reverse the audio connection 162 and 164 to the transmitter 12. This reversal of the audio connections immediately causes the polarity of the audio signal appearing across the secondary winding 176 of the audio transformer 170 to reverse and positive modulation occurs at or above, the level of the negative audio signal.

With the audio connections 162 and 164 reversed by the contacts 156 and 158 of the relay circuit 146, the negative peak pulses 202 that would have normally driven the modulator unit of the transmitter (not shown) in a negative direction will now act to positively drive the unit. This means that the positive pulses 200 will now negatively modulate the transmitter 12 and the audio connections 162 and 164 will remain in this reversed condition until the negative audio signal to the transmitter again exceeds the positive audio signal.

From the foregoing it will be readily apparent that a modulation control device of the type disclosed has several distinctive and highly desirable features. It provides a relatively simple yet totally effective method of preventing overmodulation in a negative direction and also permits a transmitter to be operated at a higher average modulation level without undesirable interference being produced in adjacent channels. This increase in the average modulation level in turn permits a larger area to be served without an increase in the amount of carrier power being required. Furthermore, the fact that no change in the transmitter circuit itself is required when the modulation control device is installed permits the device to be used with existing transmitters. The ease with which the device can be adjusted for proper operation is also highly advantageous since it does not require any special test equipment or technical knowledge not already available at existing transmitter locations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method for maintaining a maximum average modulation output level for an amplitude modulated signal source which provides an amplitude modulated carrier output signal upon the reception of an input signal from a modulating wave source which consists in deriving from said amplitude modulated carrier output signal an alternating electromotive force proportional to the input signal from said modulating wave source, comparing the peaks of the negative excursions of said alternating electromotive force to the peaks of the positive excursions thereof, deriving from said peak comparison a control signal of a polarity and amplitude dependent upon the average variation in amplitude between said negative and positive peaks, and employing said control signal to control the polarity of the input signal received by said amplitude modulated signal source from said modulating wave source whereby a maximum average modulation level of one polarity is maintained.

2. A method for maintaining a maximum average modulation output level for an amplitude modulated signal source which provides an amplitude modulated carrier output signal upon the reception of an input signal from a modulating wave source which consists of deriving from said amplitude modulated carrier output signal an alternating electromotive force proportional to the input signal from said modulating wave source, detecting the negative and positive peak signals of said alternating electromotive force, comparing the average detected negative peak pulses to the average detected positive peak pulses, deriving from said average peak comparison a control signal having a polarity and amplitude dependent upon the average variation in amplitude between said negative and positive peaks, and employing said control signal to reverse the polarity of the input signal received by said amplitude modulated signal source from said modulating wave source whenever the average detected negative peak pulses exceed in amplitude the average detected positive peak pulses, whereby a maximum average modulation level of one polarity is maintained.

3. A method for maintaining a maximum average modulation output level for an amplitude modulated signal source which provides an amplitude modulated carrier output signal upon the reception of an input signal from a modulating wave source which consists of demodulating the carrier output signal to derive an alternating demodulated signal proportional to the input signal from said modulating wave source, detecting the negative component of said demodulated signal to produce a first electromotive force of negative polarity, detecting the positive component of the demodulated signal to produce a second electromotive force of positive polarity, comparing the peaks of the waveforms of said first and second electromotive forces to derive a control signal of a polarity and amplitude dependent upon the average variation in amplitude between the peaks of said first and second electromotive forces, and employing said control signal to reverse the polarity of the input signal received by said amplitude modulated signal source from said modulating wave source when the average peak amplitude of said first electromotive force exceeds the average peak amplitude of said second electromotive force to maintain a maximum average modulation level of positive polarity.

4. In combination with a signal tranmitting system having a signal transmitter for transmitting an amplitude modulated carrier output signal upon the reception of an input signal from a modulating wave source, a polarity sensing and reversing system comprising input means for receiving said transmitted modulated carrier output signal, demodulating means connected to said input means, said demodulating means operating to derive from said amplitude modulated carrier output signal an alternating electromotive force proportional to the input signal from said modulating wave source, comparison means connected to said demodulating means and operating to compare the peaks of the negative excursions of said alternating electromotive force to the peaks of the positive excursions thereof to obtain a control signal of a polarity and amplitude dependent upon the average variation in the amplitude between said negative and positive peaks, polarity switching means connected between said signal transmitter and said modulating wave source, said polarity switching means being operative to reverse the polarity of the input signal directed from said modulating wave source to said signal transmitter, and switch control means connected to receive said control signal from said comparison means, said switch control means operating to actuate said polarity switching means to control the polarity of the input signal received by said signal transmitter from said modulating wave source in accordance with the polarity and amplitude of said control signal.

5. The polarity sensing and reversing system of claim 4 wherein said switch control means includes relay control means connected to receive said control signal, said relay control means being operable to provide an output signal upon the reception of a control signal of one polarity while remaining inoperative upon the reception of a control signal of opposite polarity, and relay means connected to receive the output signal from said relay control means, said relay means operating upon the reception of said output signal to actuate said polarity switching means.

6. In combination with a signal transmitting system having a signal transmitter for transmitting an amplitude modulated carrier output signal composing a carrier signal modulated with an input signal upon the reception of an input signal from a modulating wave source, a polarity sensing and reversing system comprising input means for receiving said transmitted modulated carrier output signal, said input means including means to vary the amplitude of said received signal, demodulating means connected to said input means, said demodulating means including detector circuit means operative to derive from said modulated carrier output signal an electromotive force proportional to the input signal from said modulating wave source and a current proportional to the amplitude of said carrier signal, a metering circuit connected to selectively receive said current from said detector circuit means, said metering circuit operating to indicate the amplitude of said received modulated carrier output signal, comparison means connected to receive said alternating electromotive force from said detector circuit, said comparison means operating to compare the peaks of the negative excursions of the alternating electromotive force to the peaks of the positive excursions thereof to obtain a control signal of a polarity and amplitude dependent upon the average variation in the amplitude between said negative and positive peaks, polarity switching means connected between said signal transmitter and said modulating wave source, said polarity switching means being operative to reverse the polarity of the input signal directed from said modulating wave source to said signal transmitter, and switch control means connected to receive said control signal from said comparison means, said switch control means operating to actuate said polarity switching means to control the polarity of the input signal received by said signal transmitting from said modulating wave source in accordance with the polarity and amplitude of said control signal.

7. The polarity sensing and reversing system of claim 6 wherein said comparison means includes a first peak sensing section having an amplifier connected to receive said electromotive force and a positive peak detector and current amplifier serially connected thereto, a second peak sensing section having an amplifier connected to receive said electromotive force and a negative peak detector and current amplifier serially connected thereto, and control signal generating means connected to receive the output signals from the current amplifiers of said first and second peak sensing sections, said control signal generating means operating to produce a control signal of an amplitude dependent upon the average variation in the amplitude between the negative and positive peaks of said alternating electromotive force.

8. The polarity sensing and reversing system of claim 7 wherein said control signal generating means includes an electronic tube having a control grid connected to the current amplifier of said first peak sensing section, a cathode connected to the current amplifier of said second peak sensing section and an anode connected to said switch control means, and biasing means connected to said electronic tube, said biasing means operating to cause conduction of said tube when the negative peaks of said alternating electromotive force exceed in amplitude the positive peaks thereof.

9. The plurality sensing and reversing system of claim 8 wherein a second metering circuit is connected to selectively receive the output signal from the current amplifiers of said first and second peak sensing sections and indicate the amplitude thereof, said second metering circuit including zeroing circuit means operable to vary the output signals from said current amplifiers.

References Cited by the Examiner

UNITED STATES PATENTS

| | | | |
|---|---|---|---|
| 2,079,446 | 5/1937 | Goldsmith | 325—133 X |
| 2,808,569 | 10/1957 | Morrison | 332—37 |
| 2,811,694 | 10/1957 | Lyons | 332—38 |
| 3,035,234 | 5/1962 | Hillman | 332—37 |

DAVID G. REDINBAUGH, *Primary Examiner*.

JOHN W. CALDWELL, *Examiner*.